F. N. LOVEJOY & G. P. KAISER.
WINDOW CLEANER.
APPLICATION FILED SEPT. 17, 1913.

1,097,179.

Patented May 19, 1914.

Witnesses:
Clarence W. Carroll
D. Gurnee.

Inventors:
Frank N. Lovejoy
George P. Kaiser
by their attorneys
Davis & Worsey

UNITED STATES PATENT OFFICE.

FRANK N. LOVEJOY AND GEORGE P. KAISER, OF MACEDON, NEW YORK.

WINDOW-CLEANER.

1,097,179.  Specification of Letters Patent.  Patented May 19, 1914.

Application filed September 17, 1913. Serial No. 790,361.

*To all whom it may concern:*

Be it known that we, FRANK N. LOVEJOY and GEORGE P. KAISER, citizens of the United States, and residents of Macedon, in the county of Wayne and State of New York, have invented certain new and useful Improvements in Window-Cleaners, of which the following is a specification.

The object of the invention is to produce a device, of simple and inexpensive construction, by which a window, such as the front window of a street-car or other vehicle, may be kept clear of water, sleet, or other obstructions to clear vision, the device being so constructed that its operation may occur at rapidly recurrent intervals, without substantially obstructing the window, and preferably without attention on the part of the user. To the foregoing ends we have devised a window-cleaner having, among others, the valuable feature that the brushes, scrapers, or other cleaning instrumentalities with which it is provided are actuated by means in the form of an endless conveyer, whereby their movements may be rendered continuous, while their action upon the window is periodical and always in the same direction.

Other features of the invention will be set forth hereinafter, in connection with the following description of the illustrated embodiment of the invention.

Figure 1:
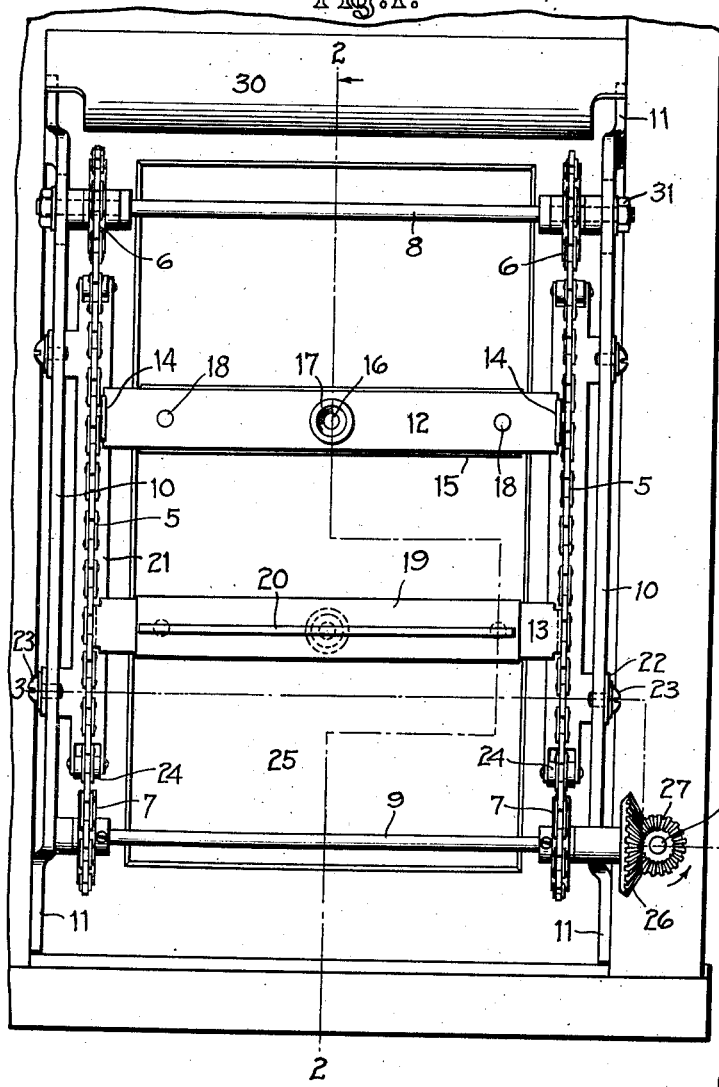
Figure 2:
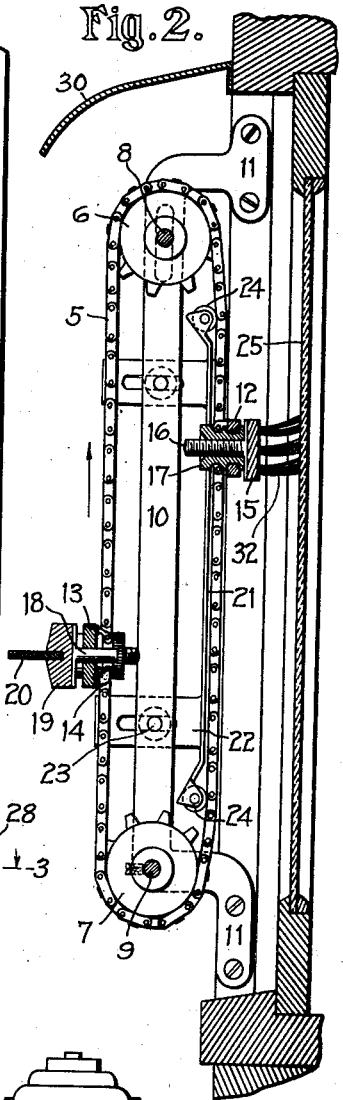
Figure 3:
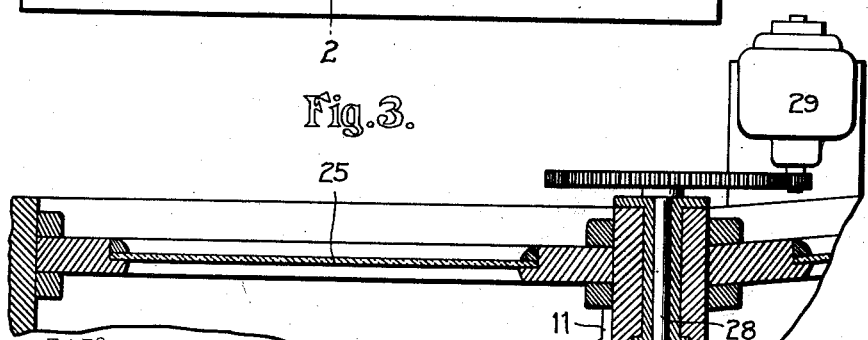

In the drawings:—Figure 1 is a front-elevation of a window-cleaner embodying the present invention, together with a window and window-frame to which it is applied; Fig. 2 is a section on the line 2—2 in Fig. 1, looking from right to left in the latter figure; and Fig. 3 is a section on the line 3—3 in Fig. 1, looking downwardly.

In the illustrated embodiment of the invention the window-cleaning instrumentalities are supported and actuated by means of two endless conveyers 5 in the form of sprocket-chains. These chains are arranged in vertical position at opposite sides of the window which is to be cleaned, and in front of the outer surface thereof. The upper portions of the chains run over sprocket-wheels 6, while the lower portions run over similar sprocket-wheels 7. The wheels 6 are mounted to turn loosely upon a horizontal shaft 8, while the wheels 7 are fixed upon a second shaft 9, by which they may be rotated so as to actuate the chains in unison. The shafts 8 and 9 are supported by two vertical frame-members 10, which are provided with rearwardly-projecting extremities 11 at their upper and lower ends, these extremities being fastened to the sides of the window-frame.

The cleaning instrumentalities are carried by two cross-bars 12 and 13, these bars having lugs 14 at their ends which are fixed to the respective chains 5—5. The bar 12 carries a brush, having an elongated back 15 in which bristles 32 are fixed. In order that the brush may bear evenly upon the window-pane from side to side thereof it is supported on the bar 12 at its middle point, by means of a screw-threaded stem 16 which engages a nut 17. As shown in Fig. 2 this nut passes loosely through a perforation in the bar 12, and is shouldered on each side thereof to prevent endwise movements of the nut. By rotating the nut the bristles 32 may be forced with any required degree of pressure against the window-pane, and the engagement between the stem, the nut, and the bar is sufficiently loose to permit a slight horizontal rocking movement of the brush with respect to the bar, sufficient to equalize the pressure from end to end of the brush. To prevent the brush from swinging in a vertical plane about the axis of the stem 16, it is provided with pins 18 which project loosely through openings in the bar 12, as shown in Fig. 1.

The cross-bar 13 carries a cleaning-device in the form of a squeegee. This comprises an elongated back-bar 19, from which a strip 20 of rubber or other flexible sheet-material projects. The squeegee is mounted upon its supporting-bar in the same manner as the brush just described.

It will be apparent that if the chains be moved continuously the brush and the squeegee will be brought alternately into engagement with the window-pane and caused to traverse its forward surface from top to bottom, the inner stretches of the chains serving to support the brush and the squeegee while they are performing their operative movements, while the outer stretches of the chains support and actuate them during their idle return movements. In order to support the inner stretches of the chains against the pressure to which they are subjected by the cleaning-devices, we employ vertical pressure-members 21, which are located immediately in front of the inner stretches of the chains, and which have forwardly-projecting arms 22, slotted to receive clamping-screws 23 by which they are adjustably fixed to the frame-members 10. This arrangement permits the pressure-members to be adjusted toward or from the window, to adapt the cleaner to the various windows in connection with which it may be used, and as this adjustment involves more or less deflection of the inner stretches of the chains from straight-line position, we employ rollers 24 at the ends of the pressure-members, to reduce the friction at the points where the chains are deflected. To provide sufficient slack in the chains for the purpose of adjustment just described, the upper shaft 8 is mounted in slots in the frame-members 10, as shown in dotted lines, the shaft being adjustably fixed in the slots by means of nuts 31 at its ends.

The mechanism above described may be actuated in any convenient manner, but we prefer to employ some source of power by which it may be actuated continuously, and without any attention on the part of the user. For this purpose we have shown in Fig. 3 an arrangement by which the window-cleaner may be driven by an electric motor. The shaft 9 is connected, by bevel-gears 26 and 27, with a shaft 28 journaled in the window-frame and extending to a point within the window, where it is connected with an electric motor 29 by means of suitable gearing. The motor is preferably arranged to rotate in such a direction that the outer stretches of the chains move upwardly and the inner stretches downwardly, as indicated by an arrow in Fig. 2. When the motor is thrown into operation, therefore, the cleaner operates continuously, the brush and the squeegee alternately being brought into engagement with the window near its upper edge, then drawn downwardly over the window, and then returned out of contact with the window.

We are aware that window-cleaners have been previously proposed in which cords or other flexible members passing around pulleys are employed to actuate brushes, scrapers, or other devices in order to draw them over the window-surface. In such previous devices, however, so far as we are informed, no provision has been made for drawing the cleaning-devices always in one direction over the window-surface, while at the same time moving them continuously in the manner of the present construction. It is a valuable feature of our construction that the cleaning-devices may be made to pass always from top to bottom of the window, when in operation, since this cleans the window much more effectively than if they are moved in opposite directions over the surface.

When the cleaner is in operation it does not seriously obstruct the view from the window, since the chains are not located directly in front of the window-pane, while the transverse members are in constant motion so as not to obstruct the window at any particular point for any substantial length of time. When the cleaner is not in use it is preferably stopped in a position in which the brush is at the top of its path of movement, and the squeegee at the bottom. To protect the brush against snow or water when in this position an appentis 30 is fixed to the window-frame immediately above the cleaner.

Our invention is not limited to the embodiment thereof hereinbefore described and illustrated in the accompanying drawings, but it may be embodied in various other forms within the nature of the invention as it is defined in the following claims.

We claim:—

1. A window-cleaner having, in combination, an elongated window-cleaning device; an endless conveyer; and means for supporting the conveyer, in extended position, with two stretches of which one is adjacent to and parallel with the window to be cleaned; the window-cleaning device being mounted, in transverse position, on the conveyer, and the conveyer being continuously movable in one direction, whereby the window-cleaning device may be first drawn across the window upon one stretch of the conveyer and then returned to its original position, out of contact with the window, upon the other stretch of the conveyer.

2. A window-cleaner having, in combination, two parallel endless conveyers; means for supporting the conveyers with their inner stretches adjacent to and parallel with a window-pane; a transverse member supported, at its ends, by the conveyers and provided with window-cleaning means; and means for actuating the conveyer-supporting means to impart continuous simultaneous movement to the conveyers, whereby the window-cleaning means are first drawn across the window-pane on the inner stretches of the conveyers, and then returned on the outer stretches of the conveyers.

3. A window-cleaner having in combination, an endless conveyer; a window-cleaning device supported and actuated thereby; two wheels upon which the conveyer is supported, in extended position, with two stretches of which one is adjacent to the window to be cleaned; and a pressure-member engaging said stretch of the conveyer on the opposite side from the window, to support the conveyer and the cleaning-device and cause the latter to press against the window.

4. A window-cleaner having, in combination, an endless conveyer; a window-cleaning device supported and actuated thereby; two wheels upon which the conveyer is supported, in extended position, with two stretches of which one is adjacent to the window to be cleaned; and a pressure-member engaging said stretch of the conveyer on the opposite side from the window, to support the conveyer and the cleaning-device and cause the latter to press against the window, the pressure-member being adjustable toward and from the window and having rollers at its ends to engage the chain.

5. A window-cleaner having, in combination, two parallel endless conveyer-chains; means, including sprocket-wheels, for supporting the chains in extended position with their inner stretches adjacent to and parallel with a window; means for rotating the sprocket-wheels to actuate the chains; a cross-bar fixed at its ends to the chains; an elongated window-cleaning member; and means connecting the cross-bar and said member, at their middle points, to support said member and force it into operative engagement with the window, said means being adjustable to move the cleaning-member toward or from the window and vary its pressure against the window.

FRANK N. LOVEJOY.
GEORGE P. KAISER.

Witnesses:
FARNUM F. DORSEY,
D. GURNEE.